United States Patent [19]

Axelrod

[11] Patent Number: 4,674,444
[45] Date of Patent: Jun. 23, 1987

[54] CHEWING TOY FOR DOGS AND PREPARATION THEREOF

[76] Inventor: Herbert R. Axelrod, Box 427, Neptune, N.J. 07753

[21] Appl. No.: 750,136

[22] Filed: Jul. 1, 1985

[51] Int. Cl.⁴ ............................................. A01K 29/00
[52] U.S. Cl. ................................................... 119/29.5
[58] Field of Search .................. 119/29, 29.5; 426/805

[56] References Cited

U.S. PATENT DOCUMENTS

| | | | |
|---|---|---|---|
| 1,149,170 | 8/1915 | Allis | 119/29.5 |
| 2,610,851 | 9/1952 | Jones | 119/29.5 |
| 3,104,648 | 9/1963 | Fisher | 119/29.5 |
| 3,871,334 | 3/1985 | Axelrod | 119/29.5 |
| 4,212,896 | 7/1980 | Brown, Jr. et al. | 426/805 |
| 4,557,219 | 12/1985 | Edwards | 119/29.5 |

*Primary Examiner*—Hugh R. Chamblee
*Attorney, Agent, or Firm*—Fulwider, Patton, Rieber, Lee & Utecht

[57] ABSTRACT

A chewing toy for dogs and a process for its preparation, wherein a nylon piece, preferably having the shape of a bone, has an impregnated layer of caramelized sugar adjacent but below its surface to impart a dark brown color and a flavor to the near-surface region of the toy. The chewing toy is prepared by placing a piece of water-absorbent nylon into an aqueous solution of caramelized sugar at a temperature of about 250° C. and an applied pressure of about 30 psi for a period of at least about 8 hours, so that the aqueous solution penetrates into the surface of the piece to impart the dark brown color to the near-surface region of the piece. The coloring and sweet taste provide an initial appeal to the animal, increasing its initial acceptance of the toy. The heat treatment also anneals the as-formed nylon to impart greater strength, reduce brittleness, and improve its resistance to shattering. The toy may also be treated with a second appeal-enhancing agent, such as a ham scent and flavor, to provide a further appeal to the animal.

11 Claims, 4 Drawing Figures

CHEWING TOY FOR DOGS AND PREPARATION THEREOF

BACKGROUND OF THE INVENTION

This invention relates in general to pet toys, and, more particularly, to an artificial chewing bone having enhanced appeal for dogs.

Chewing toys for dogs perform at least two important functions. First, dogs today often do not have access to natural bones and other hard objects which scour their teeth when chewed. Artificial chewing toys therefore provide an important health function by cleaning the animal's teeth. Secondly, the animal tends to expend its chewing energies on the artificial chewing toy, and is therefore less inclined to destructively chew on household objects.

It has sometimes be claimed that certain hard pet foods are sufficient to clean a dog's teeth, but such foods generally are consumed by the animal before an extensive cleaning of the teeth is accomplished. A variety of artificial chewing toys have been tried, with varying degree of success. For example, artificial chewing toys have been made from rawhide, woven fibers, and rope, but such materials are ordinarily rapidly destroyed by the chewing action, which breaks down the fibers and structure of the material.

More recently, a nylon chewing toy impregnated with appealing odors and flavors has achieved extensive commercial success. Nylon itself is tough and durable, but it not naturally attractive to the animal. By a process described in U.S. Pat. No. 3,871,334, it has been possible to impregnate appealing odors and flavors directly and deeply into the nylon, so that the animal is encouraged to continue chewing at the bone-shaped nylon piece. The odor and flavor-inducing components are so bound into the structure of the nylon bone that they are not released until the animal works its way through the nylon to contact each portion of the nylon bone. The nylon also is highly effective in cleaning the animal's teeth, since the nylon fibers fray at the ends as they are chewed, and the bristles formed clean the animal's teeth effectively. The nylon chewing toy is sufficiently tough and durable to retain its shape and structure for prolonged periods of attack by the animal, so that the cleaning action on the teeth is also prolonged.

The nylon chewing toy has met with considerable commercial success, but testing on animals has shown that not all dogs are immediately attracted to the nylon chewing toy. Nylon is an inert artificial substance without food value, and the animal must be attracted to chew on the nylon bone before the bone can perform its function. Typically, about 10% of dogs are attracted to chew on a nylon bone which has not been treated in any way, while about 60% of the animals are attracted to chew on nylon bones which have been chemically impregnated with desirable odors and flavors in accordance with the process set forth in U.S. Pat. No. 3,871,334. A variety of meaty materials and combinations of materials in accordance with this patent have been tried in an effort to increase the acceptability to the animals, including beef, chicken, and ham flavorings. The greatest success has been that with a ham-flavored nylon bone, to which about 61% of the animals are attracted. However, no flavorent or combination of flavorents has been found successful in increasing the acceptability substantially above this level.

There exists a need for an improved nylon chewing toy having greater acceptability to animals. With such a product, more dogs would be induced to chew at the nylon bone to clean their teeth and expend their chewing energies on the bones rather than household goods, and fewer consumers would be unhappy because their dogs reject the artificial bones. The present invention fulfills this need, and further provides related advantages.

SUMMARY OF THE INVENTION

The present invention resides in an improved nylon chewing toy having an increased acceptability to dogs and to consumers. The nylon chewing toy is found acceptable by over 80% of dogs which are offered the toy. The processing used to prepare the nylon chewing toy enhances customer appeal, as the toy has an appearance more nearly like that associated with rawhide and meat-bearing bones. Additionally, the processing used to prepare the nylon chewing toys enhances the strength of the nylon and reduces its brittleness, both of which improve the performance of the bone when chewed by the animal.

In accordance with the invention, a chewing toy for dogs comprises a piece of water absorbent nylon having an impregnated layer of caramelized sugar adjacent its surface to impart a dark brown coloring and sweet taste to the near-surface region of the toy, whereby the appeal of the toy to the dog is increased. Optionally, the toy also has a second appeal-enhancing agent impregnated therein, such as ham, beef or chicken flavor and odor producing agents. The nylon piece preferably has the shape of a bone.

In another aspect of the invention, a process for manufacturing a chewing toy for dogs comprises the steps of forming a piece from a water-absorbent nylon, such as nylon 6,6, preparing an aqueous solution of caramelized sugar having a minimum sugar content of about 2% by volume, and immersing the nylon piece into the aqueous sugar solution at a pressure of from about 5 to about 75 pounds per square inch, at a temperature of from about 80° C. to about 300° C., for a period of at least about 2 hours, so that the aqueous sugar solution penetrates into the surface of the bone-shaped piece to impart a dark brown color and sweet taste to the near-surface region of the nylon piece. In a most preferred embodiment, the sugar content of the aqueous solution is about 10% by volume, the pressure is about 30 pounds per square inch, the temperature is about 250° C., and the immersion time is about 8 hours. A second appeal enhancing agent may be impregnated into the chewing toy at any appropriate step of the manufacturing process, preferably using another immersing step.

The resulting nylon chewing toy has a dark brown surface color and apparently a sweet taste to the animal, and the color and taste are found to penetrate to a depth below the surface of the toy. The color and taste are particularly effective in increasing the appeal to the consumer who purchases the toy and to the animal itself. The animal is thought to be initially induced to chew on the toy by the color and sweet taste. The process of the present invention does not preclude other processing to provide a meaty odor and flavor, so that the two processes could be used together to achieve a combined appeal to the animal.

In addition to providing an appeal for the consumer and the animal, the processing of the present invention also enhances the physical characteristics of the nylon used in the chewing bone. The elevated temperature treatment of impregnating the caramelized sugar into the nylon anneals the nylon to increase its strength. Additional water is infused into the nylon, which reduces the brittleness of the nylon and makes the nylon chewing toy less likely to splinter when chewed by the animal. Other features and advantages of the present invention will become more apparent from the following more detailed description, taken in conjunction with the accompanying drawings, which illustrate, by way of example, the principles of the invention.

DETAILED DESCRIPTION OF THE PREFERRED EMBODIMENT

Figure 1:
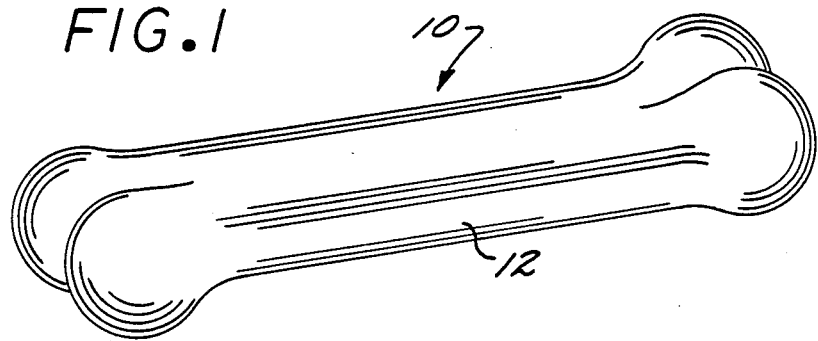
FIG. 1 is a plan view of a chewing toy in accordance with the invention, with portions broken away to illustrate the interior of the toy schemically.

A chewing toy 10 of the present invention is conveniently made in the form of a bone 12 to be chewed by dogs, as illustrated in FIG. 1. The bone 12 is preferably prepared from nylon in a convenient size for chewing by the animal, such as about 12 cm long. Other shapes such as rings may also be used as chewing toys. The bone 12 is formed from nylon, which is the term applied to polyamides which are formed by the condensation of polyfunctional carboxylic acids and polyfunctional amines. For example, the preferred type of nylon, nylon 6,6, is formed by the condensation polymerization of adipic acid and hexametnylenediamine. Such nylon bones are strong, resistent to abrasion, absorbent, and non-toxic. Satisfactory nylon material may be obtained commercially from DuPont Chemical Company.

Nylon is particularly suitable for use as a chewing toy for dogs, since the toy exhibits surface roughening upon being chewed. The chewing action produces short tufts of materal projecting from the surface of the toy, and these nylon tufts clean the teeth of the animal when the toy is chewed. The nylon is formed into any desired shape, preferably the bone 12, by molding, injection molding, or other plastic forming operations. The chewing toy 10 of the present invention may be prepared using a bone 12 in its as-formed condition, or the bone 12 may be previously treated.

In accordance with the invention, the chewing toy 10 for dogs, preferably in the shape of the bone 12, comprises a bone-shaped piece of nylon having an impregnated layer 14 of caramelized sugar adjacent its surface 16 to impart a dark brown color and a sweet taste to the near surface region of the toy 10. It is believed that the color and taste of the impregnated layer 14 are highly instrumental in initially attracting the animal's attention to the bone, and in maintaining the animal's interest over a long period of time. Once the animal's interest has been initially established in the toy, the animal tends to adopt the toy as its own and continue to use it for extended periods of time through formation of a habit. Thus, the initial attraction provided by the color and taste of the layer 14 is particularly important in establishing the beneficial use of the toy by the animal.

Infusion of the caramelized sugar to form the layer 14 has important additional benefits. The process for preparing the pet toy 10 involves heating the bone 12 at elevated temperatures and pressures in an aqueous solution, as will be described subsequently. The heating treatment enhances the strength of the nylon, thus improving its performance in resisting the chewing action of the animal. Even where the bone 12 has been pretreated, the additional heating treatment further enhances the strength of the nylon. Further, nylon tends to be brittle when dry but is hygroscopic, so that the aqueous heating under an applied pressure infuses moisture into the layer 14. When dry, nylon may be brittle, and the additional infusion of water decreases the brittleness and reduces the likelihood that the bone will splinter when chewed by the dog, thus improving the performance and life of the pet toy 10. Additionally, untreated or pre-treated nylon pet toys are typically off-white or light yellow in color, and the dark brown coloring of the present pet toy 10 distinguishes the present bone, thus increasing its appeal to consumers who purchase the product. That is, the pet toy 10 of the present invention has an appearance which differs considerably from that of a plastic material and more closely resembles a natural material, thus improving its desirability in the eyes of those who actually purchase the product. This desirable coloring is not lost upon storage, water immersion, or chewing by the animal.

In accordance with the processing aspect of the invention, a process for manufacturing the pet toy 10 comprises the steps of forming the bone-shaped piece 12 from a water absorbent nylon, preparing an aqueous solution of caramelized sugar having a minimum sugar content of about 2% by volume, and immersing the bone-shaped piece 10 in the aqueous sugar solution at a pressure of from about 5 to about 75 psi, at a temperature of from about 80° C. to about 300° C., for a period of at least about 2 hours, so that the aqueous sugar solution penetrates into the surface of the bone-shaped piece 12 to impart a dark brown color and a sweet taste to the near-surface layer 14 of the bone 12. The greater the sugar concentration in the solution, pressure and temperature, the darker the surface color.

The bone 12 may be formed from nylon by any convenient technique known in the art, such as press molding or injection molding. In press molding, a suitable volume of nylon is placed into a heated mold, and the mold closed to conform the nylon to the shape of the mold. In injection molding, the preferred approach, heated nylon is forced through a small opening into a closed cavity, from which the piece is subsequently ejected.

The aqueous solution of caramelized sugar is prepared by mixing a concentrated solution of caramelized sugar with water in the appropriate ratios. Caramelized or "burned" sugar is formed by heating sugar, either with or without the presence of ammonium ions. The heating process results in a liquid, darkened color to the sugar. Caramelized sugar is typically available as a commercial product in concentrations and volumes suitable for use in the present process. Caramelized sugar may be prepared from cane sugar, malt syrup, or dextrose, or other sugar containing starting materials. For use with the present process, cane sugar caramel is preferred, but other caramels may also be used. The solution for immersing the bones 12 can be prepared by diluting the commercial caramelized sugar solution with water, in the appropriate ratios. A solution of about 6 gallons of caramel solution in 70 gallons of water is preferred, although lesser amounts of caramelized sugar are operable. The sugar minimum concentration of the solution of caramelized sugar is about 2% by volume, inasmuch as lesser amounts are unsatisfactory in producing the desired color and flavor effects. A suitable caramel may be purchased commercially as "B & C Caramel Color" from Metzendorf, Inc., 110 Newfield Avenue, Edison, N.J. Optionally, a flavorant such as a small amount of cocoa powder can be added to the caramel or caramel solution before the bone-shaped pieces 12 are immersed.

Figures 2, 3:
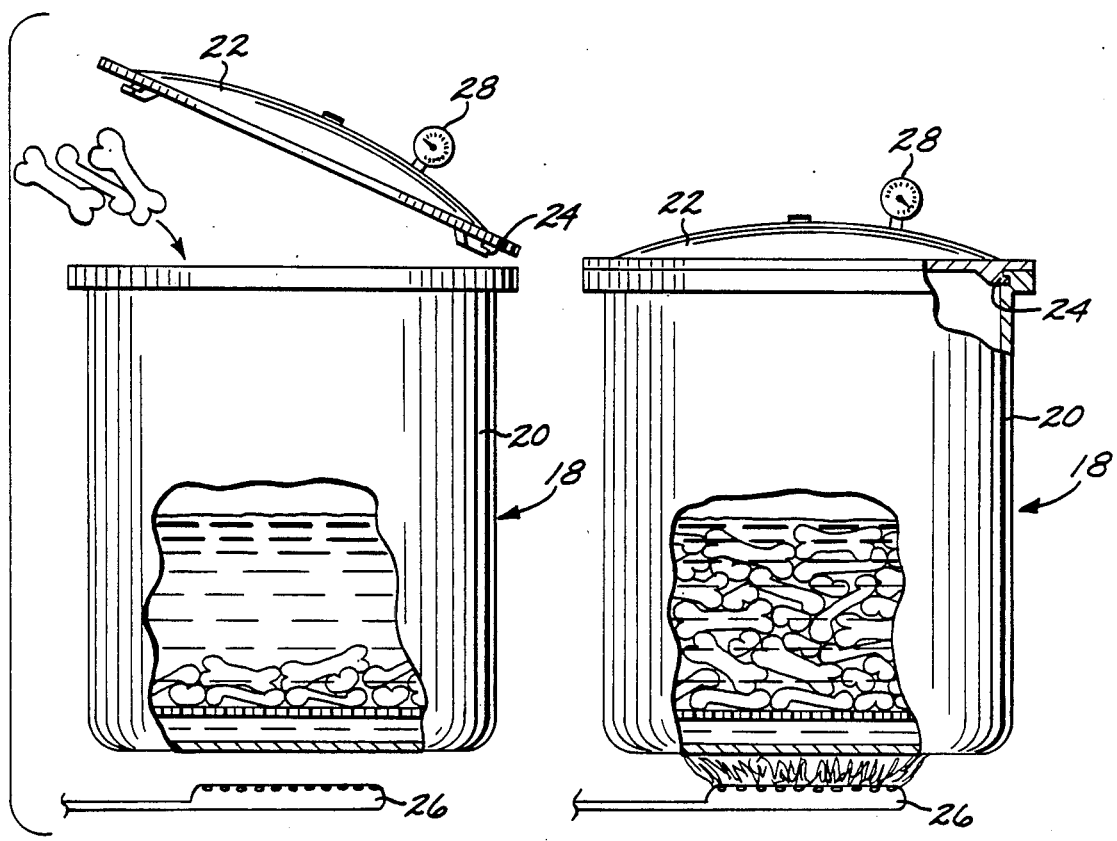
FIG. 2 is a side elevational view of pressure processing apparatus used to prepare the chewing toy, with portions broken away to illustrate the interior of the apparatus, as the toys are loaded for processing.
FIG. 3 is a side elevational view of pressure processing apparatus used to prepare the chewing toy, with portions broken away to illustrate the interior of the apparatus, during the processing.

The nylon bone-shaped piece 12 is immersed into the aqueous caramelized sugar solution in a pressure treater 18, illustrated in FIGS. 2 and 3. The pressure treater 18 includes a vessel 20 and a lid 22, which may be sealed to the vessel 20 by clamps 24. The pressure treater 18 may be heated externally, as by gas jets 26, or may be heated internally, as by a heating coil.

Figure 4:
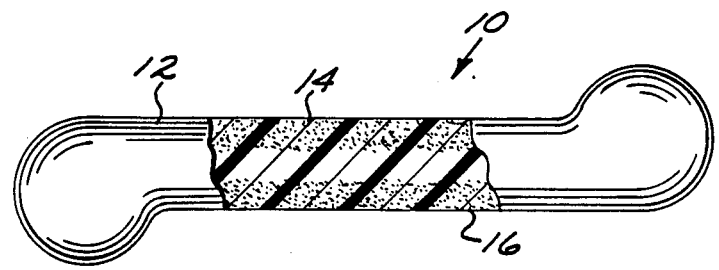
FIG. 4 is a side elevational view of a chewing toy, with portions in section to illustrate the internal structure of the toy.

In one embodiment, the bones 12 are also treated to impart to them a meaty scent and flavor, preferably by the process disclosed in U.S. Pat. No. 3,871,334, which disclosure is herein incorporated by reference. This treatment can precede or follow the treatment wherein caramelized sugar is infused into the bone 12. A modified pressure treater is illustrated in FIGS. 2-4 of that patent, wherein a wire basket is utilized in conjunction with the pre-treating process. Such a pressure treater is operable in conjunction with the present invention, so that the meat-treatment process and the immersion in caramelized sugar solution may be accomplished in the same vessel thereby minimizing the capital requirements for practicing the processes.

The caramelized sugar solution and bones 12 are charged into the pressure treater 18, and the lid 22 is sealed to the vessel 20 by the clamps 24. Heat is applied to heat the pressure treater 18 to a temperature of from about 80° C. to about 300° C., preferably about 250° C. Upon heating the solution above its boiling point, the pressure inside the pressure treater 18 increases, and may be controlled by releasing steam from a valve 28. The pressure within the pressure treater 18 is maintained at about 5 to about 75 psi, preferably about 25 to about 30 psi.

The pressurized heat treatment is continued for a period that is sufficient to infuse the caramelized sugar solution into the the near-surface layer 14 of the bone 12, thereby producing a dark brown color and a sweet taste near the surface of the bone 12. The dark brown color is evident to the eye upon completion, but there is no taste which may be detected by the human tongue upon completion of the process. The heating treatment requires a period of at least about 2 hours, and preferably about 8 hours.

The ratio of the amount of bones 12 to caramelized sugar solution in the pressure treater 18 is not critical, as long as a sufficient amount of the caramelized solution is present to achieve complete immersion of the bones 12 during the entire cooking process.

After the heat treating process is complete, the bones 12 are removed from the pressure vessel 18, and washed in water to remove any excess material from the surface of the bones. Typically, no layer of crystallized sugar or other material is observed at the surface of the bones, and after washing and drying, the bones may be immediately packaged for sale.

The following examples illustrate a most preferred embodiment of the invention, but should not be taken as limiting the invention in any respect.

EXAMPLE 1

An aqueous solution of caramelized sugar was prepared by mixing 6 gallons of caramelized sugar concentrate with 70 gallons of water to form a caramelized sugar solution, to produce a solution having about 10% sugar. Bone-shaped pieces of nylon 6,6 were immersed into the solution in a pressure treater, so that the bones were completely covered by the solution. The lid was clamped onto the vessel and the pressure vessel heated to a temperature of about 250° C. and a pressure of about 30 psi, for a period of about 8 hours. The treated pet toys were then removed from the pressure vessel and washed. The pet toys were observed to have a dark brown color, which color was found to penetrate into the surface of the pet toy. The remaining volume of the pet toy had the off-white color characteristic of untreated nylon bones.

EXAMPLE 2

Bones made in accordance with the preferred embodiment of Example 1 were product tested on a representative groups of dogs. It was found that 83% of the dogs were initially attracted to the treated bones, while only 61% of the dogs were attracted to bones which had been treated in accordance with a ham-bone flavoring process as disclosed in U.S. Pat. No. 3,871,334, and only 22% of the dogs were attracted to formed nylon bones which had neither treatment.

As will now be appreciated, the pet toys of the present invention are more preferred by dogs than those previously known. Dogs are therefore more likely to adopt the pet toys for their chewing so that the beneficial effects of the chewing process are achieved. The process of the present invention aids in achieving initial and longer term pet acceptance of the pet toy. Additionally, the present pet toy has improved strength and reduced tendancy to splintering as compared with prior nylon pet toys, due to the beneficial processing of the present invention. Although a particular embodiment of the invention has been described in detail for purposes of illustration, various modifications may be made without departing from the spirit and scope of the invention. Accordingly, the invention is not to be limited except as by the appended claims.

What is claimed is:

1. A chewing toy for dogs, comprising a piece of water-absorbent nylon having a dark layer adjacent to its surface which is impregnated with sugar, the dark color and sweet taste of the near-surface region of said toy increasing the appeal of the toy to dogs.

2. The toy of claim 1, wherein the piece of nylon has the shape of a bone.

3. The chewing toy of claim 1, wherein said chewing toy has a second appeal-enhancing agent impregnated therein.

4. The chewing toy of claim 1, wherein said chewing toy has a ham odor and flavor agent impregnated therein.

5. The chewing toy of claim 1 wherein the dark layer is brown and is impregnated with carmelized sugar.

6. A process for manufacturing a chewing toy for dogs, comprising the steps of:

forming a piece from a water-absorbent nylon;
preparing an aqueous solution of caramelized sugar having a minimum sugar content of about 2 per cent by volume; and
immersing the nylon piece into the aqueous sugar solution at a pressure of from about 5 to about 75 pounds per square inch, at a temperature of from about 80° C. to about 300° C., for a period of time of at least about 2 hours, so that the aqueous sugar solution penetrates into the surface of the nylon piece to impart a dark brown color and a sweet taste to the near-surface layer of the nylon piece.

7. The toy of claim 6, wherein the piece of nylon has the shape of a bone.

8. The process of claim 6, including an additional step of:
impregnating a second appeal-enhancing agent into the chewing toy.

9. The process of claim 6, including, after said step of immersing, an additional step of:
washing the nylon piece in water.

10. The process of claim 6, wherein the sugar content of the aqueous solution is about 10 pecent by volume.

11. The process of claim 6, wherein the pressure in said step of immersing is about 30 pounds per square inch, the temperature is about 250° C,. and the time of immersion is about 8 hours.

* * * * *